Figure 19:
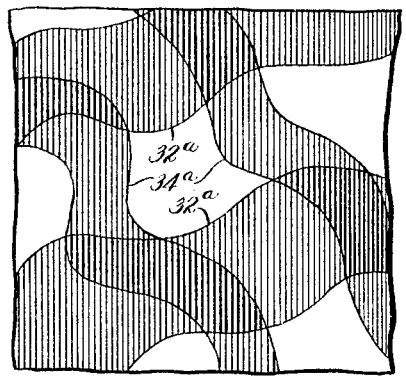

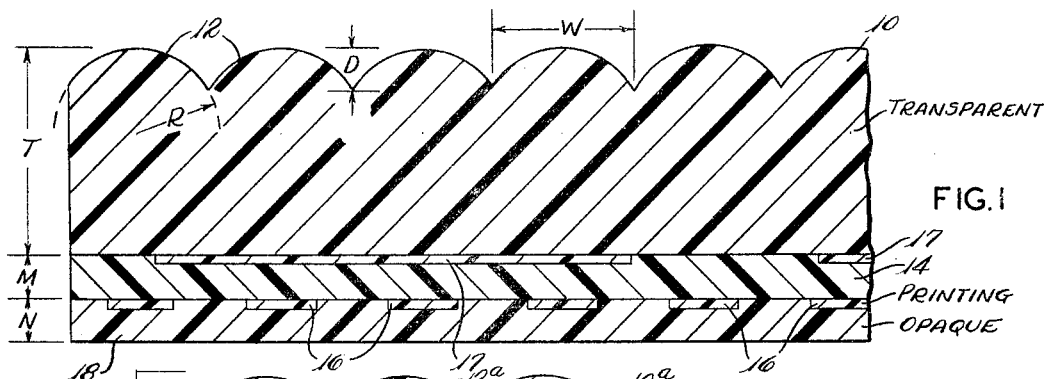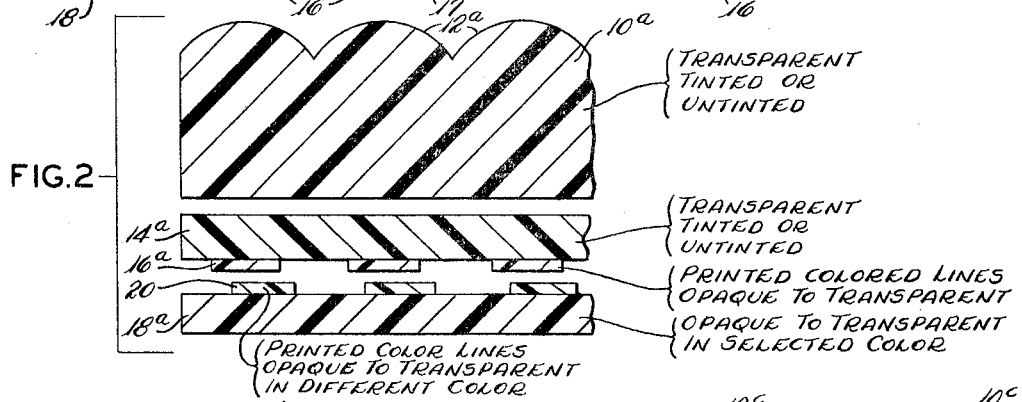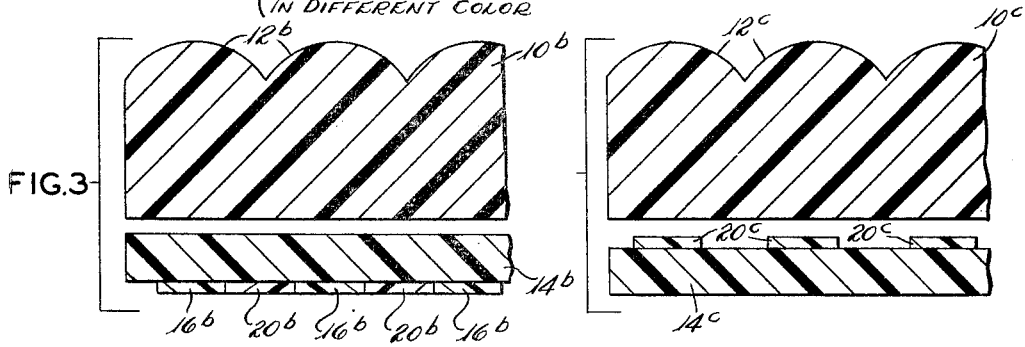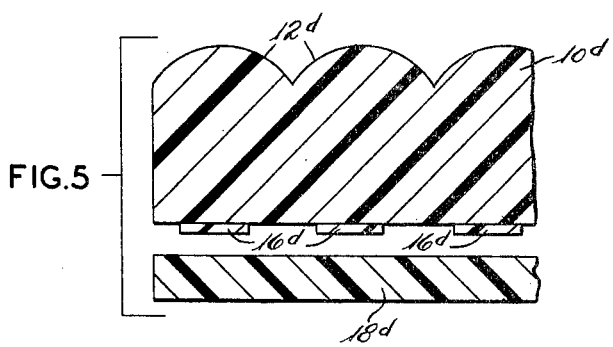
INVENTORS
RUDOLPH A. JEROTHE
NORMAN FORREST
BY
ATTYS.

Aug. 2, 1966    R. A. JEROTHE ETAL    3,264,164
COLOR DYNAMIC, THREE-DIMENSIONAL FLEXIBLE
FILM AND METHOD OF MAKING IT
Filed April 30, 1962    5 Sheets-Sheet 2

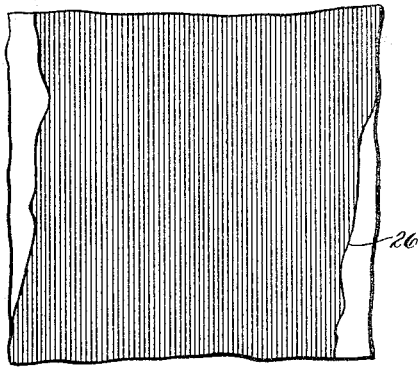

FIG.6

SINGLE MOIRE
LINES 60 - LENS 60
IN LINE

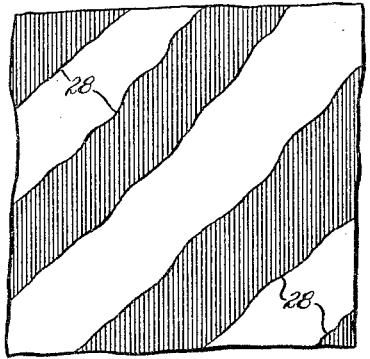

FIG.7

SINGLE MOIRE
LINES 60 - LENS 60
LENS RIGHT ½° OUT OF LINE

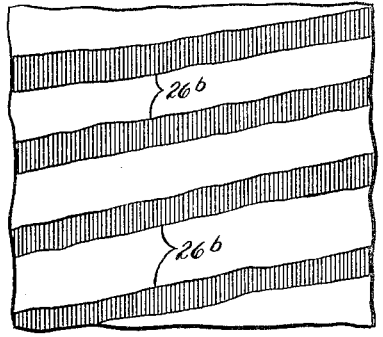

FIG.8

SINGLE MOIRE
LINES 60 - LENS 60
LENS RIGHT 1° OUT OF LINE

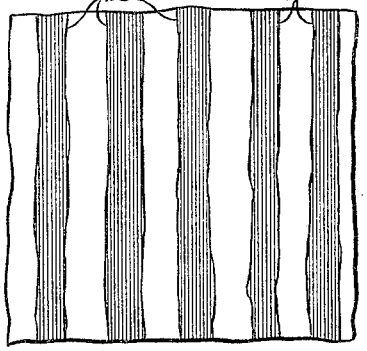

FIG.9

SINGLE MOIRE
LINES 59 - LENS 60
IN LINE

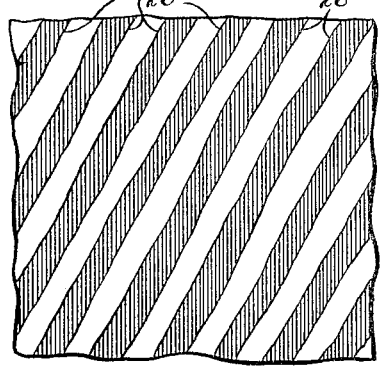

FIG.10

SINGLE MOIRE
LINES 59 - LENS 60
LENS RIGHT 1° OUT OF LINE

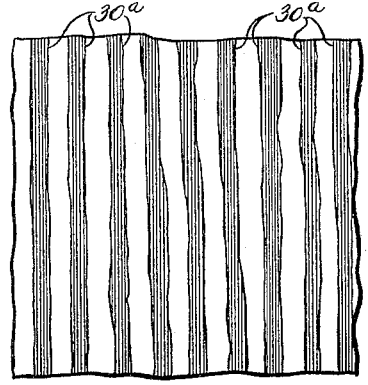

FIG.11

SINGLE MOIRE
LINES 57 - LENS 60
IN LINE

INVENTORS
RUDOLPH A. JEROTHE
BY NORMAN FORREST

*Oldham & Oldham*

ATTYS.

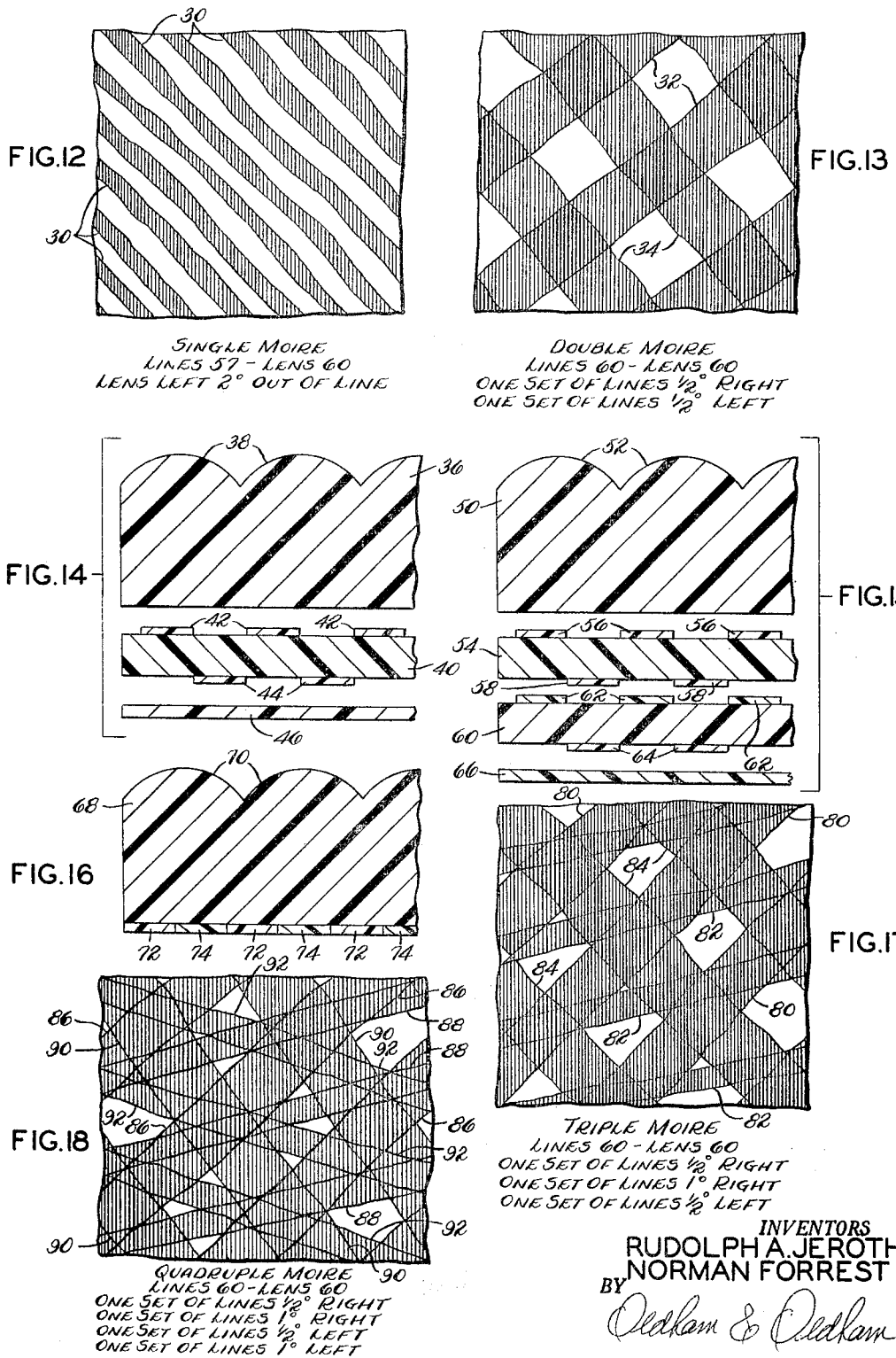

Aug. 2, 1966    R. A. JEROTHE ETAL    3,264,164
COLOR DYNAMIC, THREE-DIMENSIONAL FLEXIBLE
FILM AND METHOD OF MAKING IT
Filed April 30, 1962    5 Sheets-Sheet 4

DOUBLE MOIRE
LINES 60-LENS 60
LIKE FIG. 13 BUT BOTH
SETS OF LINES DISTORTED
IN PRINTING.

INVENTORS
RUDOLPH A. JEROTHE
NORMAN FORREST
BY
Oldham & Oldham
ATTYS.

INVENTORS
RUDOLPH A. JEROTHE
NORMAN FORREST
BY
Oldham & Oldham
ATTYS.

United States Patent Office 3,264,164
Patented August 2, 1966

3,264,164
COLOR DYNAMIC, THREE-DIMENSIONAL FLEXIBLE FILM AND METHOD OF MAKING IT
Rudolph A. Jerothe, Wayne, N.J., and Norman Forrest, White Plains, N.Y., assignors to Toscony, Inc., Passaic, N.J.
Filed Apr. 30, 1962, Ser. No. 190,956
5 Claims. (Cl. 161—33)

This invention relates to flexible or relatively thin plastic films possessing when viewed unusual three-dimensional and color flow characteristics, and, to methods for making the same.

In the last presidential election campaign certain campaign buttons were distributed bearing the picture and name of both the presidential and the vice-presidential candidates incorporated in what appeared to be substantially superimposed relation on the campaign button. However, only one picture and name appeared when the button was viewed from one position, but this first picture and name disappeared and the second picture and name appeared as the viewer somewhat changed his angular position with the button.

Thus, it has been proposed heretofore to provide signs and buttons of the indicated type and these utilize elongated segmented cylindrical lenses, with very careful provisions being taken so that one picture or name only could be seen when looking through the lenses at one angle or series of angles, and another picture or name could only been seen when looking at the sign or button from another angle or set of angles. However, prior art of the stated type falls far short of the invention of the application.

It is the general object of the present invention to provide floor and wall coverings, auto upholstery, shower curtains, drapes, and other similar sheet materials, usually flexible, of relatively thin, lightweight inexpensive and yet strong and durable construction and characterized by very striking and unusual color combinations wherein the colors wash or flow into and out of one another as an observer walks by the materials to provide extremely interesting effects and with the effects giving a three-dimensional look and appearance to the plastic materials of very unusual and striking character.

Another object of the invention is to utilize moire effects in a plurality of colors in relatively thin plastic to produce strikingly beautiful and unusual fabric-like materials.

Another object of the invention is to provide a relatively thin, simple and inexpensive three-dimensional fabric or film or plastic having the appearance of up to two or three inches in depth, and of a wide variety of colors and possible combinations.

Another object of the invention is to provide an improved method for producing the material of the invention in rapid but controllable fashion, and with the method adapting itself to reproduce the desired materials, moire effects, moire interference patterns, and selected color combinations.

Another object of the invention is to provide a laminated flexible plastic film construction usually between about eight mils and about forty mils in thickness wherein a beer bottle can be illustrated to appear embedded in a cake of ice all appearing back from the face of the pastic sheet material, or a fish can be illustrated at different distances in the water and as printed on the sheet material, or similar effects obtained.

Figure 20:
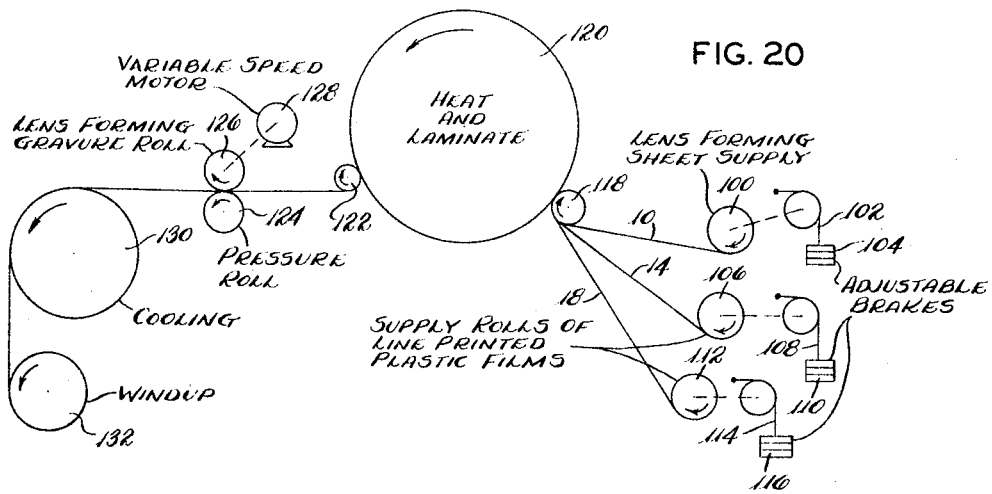
Figure 21:
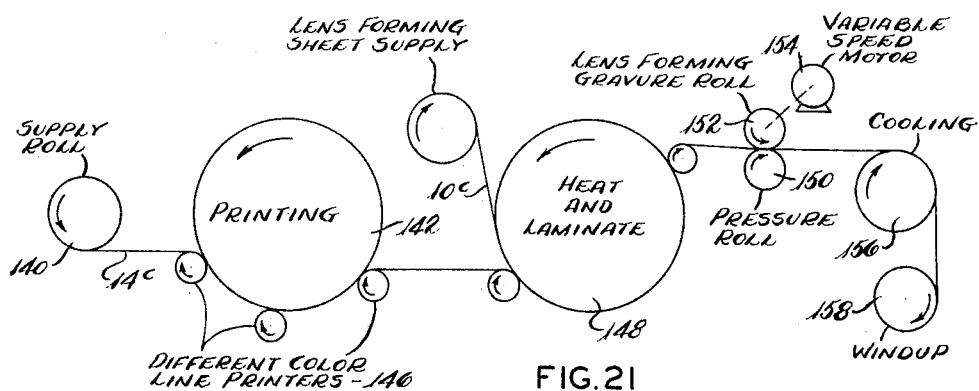
Figure 22:
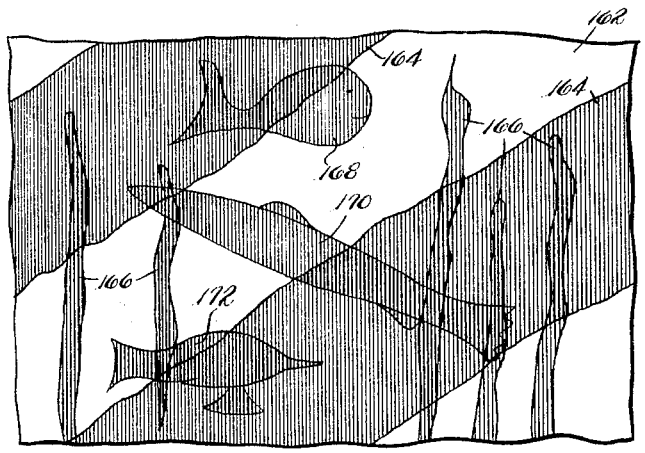
Figure 23:
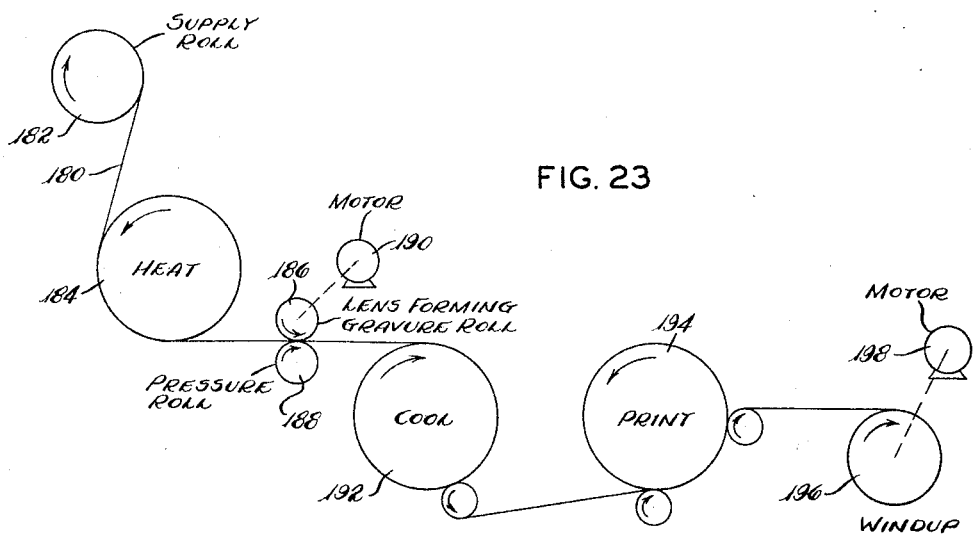

For a better understanding of the invention, reference should be had to the accompanying drawings wherein
FIG. 1 is an enlarged fragmentary cross-sectional view illustrating the laminated but flexible pastic sheet material incorporating the features of the invention;
FIGS. 2, 3, 4, 5, 14, 15 and 16 are all views similar to FIG. 1 and illustrating variations of the form of the invention shown in FIG. 1;
FIGS. 6 through 13, 17, 18, and 19 are all fragmentary front elevations of plastic film material incorporating the features of the invention and illustrating different forms of the invention;
FIGS. 20 and 21 are diagrammatic illustrations of two different methods of practicing the method of the invention to construct the controlled article of the invention;
FIG. 22 is a view like FIGS. 6 to 13 and illustrating a sheet of plastic film in which different figures of design are incorporated so that they appear to be at different distances from the surface of the film; and
FIG. 23 is a view like FIGS. 20 and 21 but illustrating another method of practicing the invention.

The invention provides a flexible, relatively thin, fabric-like material possessing striking characteristics of color and depth and comprising transparent sheet means of flexible plastic having a thickness between about eight mils and about forty mils, contiguous segments of elongated substantially cylindrical lenses formed on the outer surface of the sheet means with a relatively large number of segments per inch, such as a number capable of obtaining a moire effect, a plurality of printed selected color lines substantially equal in number to the number of lens segments per inch and extending in a position of selected alignment with said lens segments in fixed relation to the side of the transparent sheet means opposite the lens segments.

Stated in terms of method, the method of making a relatively thin, flexible, fabric-like material possessing striking characteristics of color flow and depth which comprises providing flexible transparent sheet material in continuous length and between about five mils and about forty mils thick, continuously moving the material over an elongated path, printing at least one set of colored lines on the material as it moves to provide with aligned lenses a moire effect, continuously embossing on the sheet material contiguous segments of longitudinally elongated substantially cylindrical lenses substantially in selected alignment with and substantially equal in number to the number of printed lines per inch and on a surface of the sheet material remote from the printed lines, and means for controllably changing the amount of elongation of the sheet material between the line printing operation and the lens embossing operation to control the relative number of lines per inch in relation to the lenses per inch.

In the embodiment of the invention illustrated in FIG. 1 a transparent sheet of flexible relatively thin plastic having a thickness T is provided at its upper surface with contiguous segments of elongated substantially cylindrical lenses 12 having a width W, radii R, and a depth between lens segments of a distance D. In one typical installation the thickness T of sheet 10 is from about eight mils to about forty mils. The dimension W is of a practical moire forming width which can be made commercially and in one typical embodiment this is 60 lens per inch, or 1/60 of an inch equals W. In the example of FIG. 1, D equals ¼ W or 1/240 inches, and R equals .7 W.

The following table gives other examples:

| Lines/inches, Lenses/inches | Lens Width | Lens Radius | Clear Thickness Usable to Optimum | Lens Groove Depth |
| --- | --- | --- | --- | --- |
| 50 | .020 | .014 | .020 to .040 | .005 |
| 100 | .010 | .007 | .010 to .020 | .0025 |
| 167 | .006 | .004 | .006 to .012 | .0015 |
| 200 | .004 | .003 | .004 to .008 | .001 |

Referring again to the embodiment of the invention in FIG. 1, a flexible transparent plastic sheet 14 has printed on the underside thereof a plurality of printed lines 16, the number of lines 16 being substantially equal to the number of lens segments 12 in an inch, and with the lines 16 being in a position of selected alignment with the lenses 12, all as hereinafter described. The dimension M of the material 14 is usually between about three mils and about six mils, with the lines 16 being printed thereon, as aforesaid, and so that the spacing between the lines 16 is substantially equal to the width of the printed lines so that in a typical installation the printed lines 16 cover approximately one-half of the area of the plastic 14.

Completing the embodiment illustrated is a relatively thin flexible plastic sheet 18, having a dimension N, typically three mils thick, and made of opaque white plastic which provides a backgorund of the laminate formed by the assembly of flexible sheets 10, 14, and 18.

In the form of the invention of FIG. 1, as well as in the other embodiments of the invention hereinafter described, any suitable designs 17, such as spaced flowers, patterns, or the like, can be printed in transparent to opaque inks on the underside of sheet 10 or on top of sheet 14. Because these are not printed as moire lines they appear substantially at the surface of the laminate and have no depth whereas the designs of FIG. 22 appear at different or selected depths.

The embodiment of the invention illustrated in FIG. 2 is similar to that shown in FIG. 1, with like parts being indicated with the same numerals except that in FIG. 2 the suffix "α" has been added. In FIG. 2, the lowermost sheet 18a in the laminate has printed on its top lines 20 in addition to the lines 16a prined on the underside of the film 14a, the printed lines 20 being of a different color from the lines 16a. Usually the lines 16a and the lines 20 are printed in color which is transparent so that one line can be printed over another or one color seen through the other or with the colors blending together if they are transparent. However, it is also possible to use printing lines in which these are more opaque. In fact, the printing is from any degree of complete opaqueness down to complete transparency.

Still having reference to FIG. 2, the film or sheet material 10a must be transparent, as must be the film 14a so that when the laminate is assembled the lines 16a and 20 can be seen through the lenses 12a on the upper surface of sheet 10a. However, the material of sheets 10a and 14a can be tinted to any transparent color desired, or can be left uncolored and clear, should this be desired. The film 14a could be tinted to a color different from the color to which the sheet 10a would be tinted.

In like manner, the film 18a can be made from completely opaque to completely transparent, and can be tinted or untinted, as is desired for a particular laminate. The several films, with the printing thereon as shown are laminated with the sheet 10a to produce the desired product.

FIG. 3 illustrates a laminate having an outer sheet 10b provided with appropriate lenses 12b, and to the underside of the sheet 10b is joined a film 14b which has printed thereon lines 16b of one color, and alternate lines 20b of another color. As in all examples given, the distance of overall thickness from the lines 16b and 20b to the lenses 12b is kept such to produce the best moire effect, being within the limits set forth in the table given above.

FIG. 4 is similar to the previous figures, and like numerals have been employed except that the suffix "c" has been added. The sheet 10c provided with lenses 12c is adapted to be laminated to a plastic film 14c having one or more sets of lines 20c printed on the top thereof.

In FIG. 5, the transparent plastic sheet 10d, formed with lenses 12d on its upper surface has a plurality of printing lines 16d printed on its underside, the printing being covered by a plastic film 18d which may be tinted or not tinted and varying anywhere from transparent to opaque.

Turning now to FIG. 6 of the drawings, there is shown therein a front elevation of a fabric, paper, film, or laminate showing a single moire made by 60 printed lines to the inch and 60 lenses per inch, the printed lines and lenses being in alignment. The result is a relatively large single moire or interference band 26 of the color in which the lines are printed, the band 26 being so wide as to substantially wipe out noticeable moire effects over a considerable area.

Turning now to FIG. 7, the same laminate of 60 printed lines and 60 lens lines per inch with the lens lines right one-half degree out of line with the printed lines results in the single moire of FIG. 7 wherein interference bands 28 formed of the color of the printed lines appear at an angle of about 45 degrees, the bands being separated by distances about equal to the width of the bands.

Now if in the same 60 printed lines per inch and the 60 lenses per inch, the lenses ae turned right one degree out of line with the printed lines the resulting single moire is shown in FIG. 8. In this figure the interference bands 26b have turned through a farther angle and are within 10 to 20 degrees of the horizontal, and the interference bands 26b have narrowed in a vertical direction and have come closer together than in the arrangement of FIG. 7.

Looking now at FIGS. 9 and 10, there is shown in FIG. 9 the single moire resulting when 59 printed lines per inch are utilized with 60 lenses per inch and the lines and lenses are positioned in alignment. In this arrangement the lines of interference take the form of vertically directed interference bars 28a, the bars being greater in number than when the number of lines and the number of lenses per inch were the same.

FIG. 10 illustrates the single moire which results when the 59 printed lines per inch and the 60 lenses per inch of FIG. 9 are moved out of line by moving the lenses right one degree out of line. The resulting bars 28b of moire interference then tilt to the right as shown, all being directed at approximately 60 degrees to the horizontal, and having increased slightly in number.

It will be noted that in FIG. 10 it requires movement of a greater amount of out of line between the lenses and the printed lines in order to effect the tilting of the interference bars 28b into the angular position shown in FIG. 10.

FIGS. 11 and 12 illustrate respectively the single moires which result when 57 printed lines are utilized in conjunction with 60 lenses per inch, FIG. 11 showing the printed lines and lenses in alignment. The interference bars 30a all extend vertically, but are relatively close together, of the color of the printed lines, and as seen in FIG. 10.

FIG. 12 illustrates what happens to the single moire pattern when the lenses are tilted two degrees left out of line with the printed line. The interference bars, marked 30b have now tilted to the left in an amount about equal to the tilting of one-half a degree between the printed lines and the lenses when the lines and lenses had the same number of units per inch.

The film, fabric, or sheet material of the invention becomes considerably more attractive when more than a single moire is utilized therein. For example, FIG. 13 illustrates a film in which a single moire such as illustrated in FIG. 7 and comprising interference paths 32 extending substantially at 45 degrees to the right are created by one set of color lines and another set of interference paths indicated by the numeral 34 are created by a second set of color lines, the interference paths 34 extending substantially at 45 degrees to the left. Thus, FIG. 12 illustrates a double moire having 60 printed color lines to the inch and 60 lenses to the inch, one set of color lines being positioned one-half degree to the right of the lenses and creating interference paths 32, and the second set of color lines being positioned one-hal degree to the left of the lenses and creating interference paths 34.

The double moire film of FIG. 13 can be made as illustrated in FIG. 14 to include a sheet 36 of transparent plastic formed with lenses 38 at its top and similar to the lenses heretofore described. In like manner, the thickness of the sheet 36 is within the limits heretofore set forth. Associated with the sheet 36 is a sheet 40 of transparent plastic having one set of color lines 42 printed on the top side thereof, and a second set of color lines 44 printed on the underside of the film 40. The set 42 of printed lines is positioned one-half degree to the right of the line of lenses 38 whereas the printed lines 44 comprise a set positioned at an angle one-half degree to the left of the line of the lenses 38. In the embodiment illustrated, the printed lines 42 and 44 are each 60 per inch, as are the lenses 38, and the printed lines 42 and 44 are separated by spaces substantially equal to the width of the line. The printed lines 42 and 44 are usually of transparent ink, but the ink can be translucent or even opaque, and of any selected color. If the printed lines 42 are red the interference patterns 32 produced by the lines will be red. If the printed lines 44, are green, for example, the interference paths 34 produced by the lines will be green. Still additional color can be imparted by tinting the film 40 to a selected color, or even tinting the sheet 36 to a selected transparent color. The assembly of FIG. 14 may be completed by a film 46, for example of opaque white plastic, and, for example, two or three mils thick which is laminated together with the printed film 40 and the sheet 36 to form an integral flexible laminate, all by the method hereinafter more particularly described.

The embodiment of the invention illustrated in FIG. 15 includes a sheet 50 of transparent plastic having lenses 52 formed along the upper surface thereof, the sheet 50 normally being transparent and of a thickness within the limits heretofore set forth. Associated with the sheet 50 is a film 54 which is transparent and which has colored lines 56 printed on the upper surface thereof, and a second set of colored lines of different color 58 printed on the lower surface of the film. A second film 60 has lines 62 of still another color printed on its upper surface, and lines 64 of a fourth color printed on its undersurface. Completing the assembly of the laminate is a film 66 covering the underside of the laminate. In the manner described, a quadruple moire is achieved, such as more particularly is illustrated in FIG. 18 of the drawings and hereinafter described.

In FIG. 16 a transparent flexible plastic sheet 68 having lenses 70 formed on its upper surface is provided along its lower surface with a plurality of printed lines 72 of one color and another set of printed lines 74 of a different color. In fact, any number of different color printed lines can be printed on the bottom of the sheet 68, the printed lines being printed over one another, extending at slightly different angles to each other, and the like.

In FIG. 17 is illustrated a plastic film in which a triple moire is provided. In this assembly 60 printed lines per inch are still utilized in conjunction with 60 lenses per inch. The first set of printed lines is positioned at an angle one-half degree right with respect to the lenses to form interference patterns 80 of the printed color of the lines. The second set of lines is positioned at one degree right of the lenses to produce a set of interference patterns 82 of a different color. A third set of lines printed one-half degree out of line to the left with respect to the lenses produce a third set of interference patterns 84.

FIG. 18 illustrates a plastic film having a quadruple moire which can be produced, for example, as shown in enlarged cross section in FIG. 15. In this film of FIG. 18 the printed lines are 60 per inch and the lenses are 60 per inch. One set of printed lines is positioned at an angle one-half degree to the right of the lenses to produce a set of interference patterns 86. The second set of printed lines is positioned at an angle one degree to the right of the lenses to produce a second set of interference patterns 88. A third set of printed lines is positioned at an angle of one-half degree to the left of the lenses to produce a set of interference patterns 90. A fourth set of printed lines are positioned at an angle one degree to the left of the lenses to produce a fourth set of interference patterns indicated by the numeral 92.

With each of the printed color lines of a different color, either blended colors or contrasting colors, and with transparent inks and tinting or not of the sheet and films of the laminate vary unusual appearing films and fabrics can be produced.

FIG. 19 illustrates a double moire, similar to that illustrated in FIG. 13, and in which 60 printed lines per inch and 60 lenses per inch are used, but in the printing of the lines onto the plastic film the printing of the lines is slightly distorted. The result is that the interference paths 32a and 34a are distorted and rendered more serpentine than those shown in FIG. 13 whereby additional and unusual effects can be imparted to the film material.

Having reference now to FIG. 20 of the drawings in which is diagrammatically illustrated one particular method of manufacturing the films in accord with the invention, the numeral 100 illustrates a supply roll of the relatively thick lens forming sheet 10 seen in FIG. 1. The supply roll 100 is provided with an adjustable friction brake 102 having variable weights 104 to be utilized therewith so as to provide an adjustable back tension upon the sheet 10 as it is pulled from the supply roll 100.

The supply roll 106 provides a supply of the film 14 of FIG. 1, this film being printed on one side with the colored lines and after printing being wound up on the supply roll 106. The supply roll 106 is provided with an adjustable brake 108 having adjustable weights 110 thereon so as to put a controlled back tension upon the film 14. A third supply roll 112 may be provided for the film 18 of FIG. 1, this supply roll having an adjustable friction brake 114 with adjustable weights 116 controlling the back tension on the film 118 which can be provided with printed lines or not, as desired.

The films 10, 14 and 18 are passed underneath a roller 118 which applies the films against a heating and laminating drum 120 turning in the direction indicated by the arrow so that by the time the superimposed films reach the roller 122 the films are laminated. The resulting laminate passes continuously between a pressure roll 124 and a lens forming gravure roll 126, the rolls 124 and 126 being driven by a variable speed motor 128. The gravure roll 126 is formed with a plurality of surface ribs adapted to form by pressure upon the soft upper surface of the film 10 the ribs 12 illustrated in FIG. 1. The laminate then passes over the cooling drum 130 and to the wind-up roll 132.

An important feature of the invention as just described is that it is possible by adjusting the amount of brake friction applied to the supply rolls 106 and 112 to effect a necking down or thinning of the printed film 14 or printed films 14 and 18 between the supply rolls and the laminating drum 120 which would be driven at a substantially constant speed. In this manner, it is possible to print, say, 58 lines per inch on the film 14 and to have a gravure lens forming roll 126 which forms 60 lenses per inch on the film laminate. However, by applying the controlled tension of the film 14 through the supply roll 106, the film 14 as printed is necked down under the carefully adjusted tension so that in the laminate as passed under the gravure roll 126 the number of printed lines per inch has been increased to 60. Of course, changes in the tension applied to the film 14, and/or the film 18, effect a change in the number of printed lines per inch so that the particular types of interference patterns wanted upon the finished laminated film can be achieved, and can be duplicated from run to run of the film material.

The embodiment of the invention illustrated in FIG. 21 includes a supply roll 140 of transparent flexible plastic film material, such for example, as the film material 14c illustrated in FIG. 4 of the drawings. The film material 14c is passed to a printing drum 142, and different color line printers 146 associated with the drum 142 are utilized to print a plurality of sets of different colored lines upon the film 14c at the angles and in the number of lines per inch desired. The printed film passes to a heating and laminating drum 148, and supplied to the drum 148 is a flexible transparent sheet 10c which is to be utilized to provide the lens forming surface of the laminate. After heating and laminating on the drum 148 the laminate of sheet 10c and printed film 14c passes between a pressure roll 150 and a lens forming gravure roll 152, the roll 152 being driven by a variable speed motor 154. After the lenses are formed on the laminate by the roll 152 the laminate passes, usually over cooling roll 156 to a wind-up 158.

An important feature of the method as described is that the variable speed motor 154 is carefully adjusted as to speed with respect to the rotary speed of the heating and laminating drum 148 so that the laminate passing from the drum 148 to and under the gravure roll 152 can be given an adjustable or selected amount of necking down before the lenses are formed on the upper surface of the laminate. In other words, a selected surface speed differential is established between the drum 148 and the gravure roll 152. In this manner the number of printed lines per inch laterally in the laminate passing to the gravure roll is adjusted, for example, to any amount between 58 lines per inch and 62 lines per inch, with the lenses being formed at 60 per inch at the gravure roll 152. In this manner the interference patterns on the finished film or fabric can be adjusted to the angle desired. This method is somewhat more readily practiced than that of FIG. 20, but the method and apparatus of FIG. 20 has the advantage of being able to individually alter the width of printed lines on a single film separate from printed lines on a second printed film.

The embodiment of the invention illustrated in FIG. 22 shows how it is possible utilizing the principles of the invention to produce a film or fabric having very interesting and unusual pictorial effects. For example, a film is provided in FIG. 22 in which an overall pale green or blue may be imparted by tinting with transparent color the cover sheet 162. Printed on the back of the cover sheet is a set of blue-green moire lines which define the interference patterns 164 giving a blending aquamarine color. Superimposed upon the assembly is a seaweed shaped interference pattern defined of dark green lines and forming seaweeds 166 usually appearing very near the surface of the film.

Now different articles can be positioned at different apparent depths in the film. For example, fish 168, 170, and 172 can be printed so as to appear at different depths back from the surface, the particular depth obtained being the result of the type of interference patterns obtained, all as set forth heretofore, but now described in greater detail. In general, it can be stated that the closer the print line count is to the superimposed lens count the farther apart and wider will be the interference patterns that are created and the deeper from the surface the interference pattern will appear. In other words, and having reference to the figures of the drawing, when 60 printed lines per inch are used in association with 60 lenses per inch the very wide interference pattern shown at 26 in FIG. 6 is created when the lines and lenses are substantially in alignment. This type of interference pattern appears very deep in relation to the surface of the film. In FIG. 7 is shown the interference pattern 28 which results when the printed lines are turned one-half degree out of line with the lenses 60. The resulting interference patterns 28 are relatively far apart and are comparatively deep in relation to the surface, although not so deep as if the lines and lenses were turned, for example, only one-quarter of a degree out of line.

Now as the difference between the lenses per inch and the printed lines per inch increases the interference pattern becomes closer together and the illusion of depth becomes less apparent. Note also that the small change in angular relation between lenses and lines, are generally of less than 2°, which greatly changes the interference pattern.

It is also possible to create some of the effects as shown for example in FIG. 22 by cutting pieces out of the lens and replacing the cutouts to various angles, the printed lines being similarly cut out and replaced to the new angle.

Typical examples have already been given above with respect to printed lines per inch, lenses per inch, lens width, radius, clear thickness of plastic, lens groove depth, and the like. It will be noted that if these various dimensions are scaled up or down in exact proportion the appearance of the film does not change.

The lens has heretofore been described as made up of a series of intersecting cylinders, this being particularly described in conjunction with FIG. 1. Theoretically the lenses should have a parabolic form, instead of circular, but the difference is so small with the very considerable number of lenses appearing per inch, that the circular cylinder lens has been found to be satisfactory.

Additionally, it can be noted that the moire effects obtained would be retained if the number of printed lines per inch were doubled, tripled, quadrupled, etc., still retaining the same number of lenses per inch. The product would merely be more changeable with movement and viewing angle.

The focal length of the cylindrical lenses is determined by the formula:

$$f = \frac{n}{n-1} r$$

wherein $n$ is the index of refraction of the clear plastic, 1.5 for vinyl.

Therefore $f=3r$. Normally the lens radius equals about .707 of the lens width. Lens width, in the specific example referred to repeatedly above, is $\frac{1}{60}$ of an inch. The groove depth between the lenses is approximately one-quarter of the lens width.

When films or fabrics are made up in accordance with the teaching of the invention, they may be used as wall coverings, auto upholstery, shower curtains, drapes, floor coverings, and almost anywhere where fabrics or films are utilized. It is possible and entirely feasible to incorporate the films and laminates of the invention with fabric backing or reinforcing materials, should this be desired. In any event, in use the materials are normally positioned so that the lenses and printed color lines extend vertically on wall coverings and other similar uses so that horizontal movement of a person and a person's eyes in relation to the films or fabrics gives greater flow and movement of the colors, a greater illusion of depth, and the like, than if the lenses and color lines are positioned at some other angle.

The materials of the invention when utilized as described produce a color dynamics, that is a flow and movement of the colors during the movement of an observer in front of the films or fabrics, the colors washing or flowing one into the other with very interesting and unusual results including the changing of colors, the twinkling of stars, and other surprising and interesting effects, and particularly giving the appearance of a considerable depth to the films and the fabrics, the depth ranging from a thickness just below the surface of the films up to a thickness of several inches or more thereby producing very startling and beautiful effects.

FIG. 23 shows still another manner of practicing the invention. In FIG. 23 a web 180 of relatively thin transparent material is pulled from a supply roll 182 and is passed continuously in a path over a heating drum 184 and between a lens forming gravure roll 186 and a pressure roll 188. The roll 186 as well as the roll 188 may be driven by a motor 190. Naturally the motor 190 may be varied in speed to provide a controlled stretch and thus control the relationship between lines and lenses as explained with reference to FIGURES 20 and 21 above. The web 180 may then be cooled by arcuate passage over drum 192 and is still continuously passed to printing drum 194 and to a windup 196 driven by motor 198.

While a certain representative embodiment and details have been shown for the purpose of illustrating the invention, it will be apparent to those skilled in this art that various changes and modifications may be made therein without departing from the spirit or scope of the invention.

What is claimed is:

1. A flexible, relatively thin, plastic material possessing striking characteristics of color and depth and comprising transparent sheet means of flexible plastic having a thickness between about eight mils and about forty mils, contiguous segments of elongated substantially cylindrical lenses formed on the outer surface of the sheet means with between about 50 and about 200 of segments per inch, a plurality of printed selected color lines slightly different in number to the number of lens segments per inch and extending in a position of selected alignment with said lens segments in laminated relation to the side of the transparent sheet means opposite the lens segments, said printed lines being turned to be out of line at a small angle with the lens segments so that the moire effect becomes a plurality of angularly positioned repetitive bands of interference patterns, the bands being of the color of the printed lines, the printed lines being in the form of a plurality of sets of printed lines, each set being at a different spaced relation to the lens segments and producing a moire effect with the lens segments, and each set being of a different color and making a different angle with the lens segments and having a different count per inch than the lens segments.

2. A relatively thin material including a transparent plastic body between about eight and about forty mils thick, a plurality of sets of moire forming lines laminated on one side of the body, each set being of a different color, each set being slightly out of alignment with every other set, and each set having a slightly different number of lines per inch, and a plurality of lenses on the other side of the body, the number of lenses per inch being about equal to the number of lines per inch, and the lenses extending about in alignment with the lines but making selected small departures from exact alignment.

3. That method of making a relatively thin, flexible, material possessing striking characteristics of color flow and depth which comprises providing flexible stretchable transparent sheet material in continuous length and between about five mils and about forty mils thick, continuously moving the material over an elongated path, printing a set of colored lines on the material as it moves to provide with aligned lenses a moire effect, continuously embossing on the sheet material contiguous segments of longitudinally elongated lenses substantially in selected alignment with and substantially equal in number to the number of printed lines per inch and on a surface of the sheet material remote from the printed lines, and controllably changing the amount of elongation of the sheet material by stretching thereof between the line printing operation and the lens embossing operation to control the relative number of lines per inch in relation to the lenses per inch.

4. That method of making a relatively thin, flexible, material possessing striking characteristics of color flow and depth which comprises continuously moving a stretchable, flexible, transparent, continuous web of material over an elongated path, printing a set of colored lines on the material as it moves to provide with selectively aligned lenses a moire effect, laminating with the printed sheet material a second web of flexible, stretchable, transparent sheet material in continuous lengths, continuously embossing on the second web of sheet material contiguous segments of longitudinally elongated lenses substantially in selected alignment with and substantially equal in number to the number of printed lines per inch and on the surface of the sheet material remote from the printed lines, and controllably stretching the laminated sheet immediately before the embossing thereby controlling the relative number of lines per inch in relation to the lenses per inch.

5. A method according to claim 4 which includes selectively stretching the printed sheet material and the second web before they are laminated to thereby control the relative number of lines per inch in relation to the lenses per inch.

References Cited by the Examiner

UNITED STATES PATENTS

| | | |
|---|---|---|
| 1,475,430 | 11/1923 | Curwen. |
| 1,614,924 | 1/1927 | Hutchison _____ 41—22 |
| 1,741,683 | 12/1929 | Dickey _____ 41—22 |
| 1,985,480 | 12/1934 | Carpenter _____ 161—3 X |
| 2,477,300 | 7/1949 | Karfiol et al. _____ 41—24 X |
| 2,529,701 | 11/1950 | Maloff. |
| 2,700,919 | 2/1955 | Boone. |
| 2,815,310 | 12/1957 | Anderson. |
| 2,875,543 | 3/1959 | Sylvester et al. _____ 41—19 |
| 2,951,419 | 9/1960 | Lemelson. |
| 3,024,154 | 3/1962 | Singleton et al. _____ 156—209 |

FOREIGN PATENTS 1,159,894   7/1958   France.

ALEXANDER WYMAN, *Primary Examiner.*

JACOB STEINBERG, *Examiner.*

W. POWELL, *Assistant Examiner.*